United States Patent [19]

Holmes

[11] 4,235,582

[45] Nov. 25, 1980

[54] METHOD AND APPARATUS FOR MOLDING HOLDERS FOR DISC-LIKE OBJECTS

[75] Inventor: Gordon W. Holmes, Mississauga, Canada

[73] Assignee: Professional Packaging Limited, Mississauga, Canada

[21] Appl. No.: 81,140

[22] Filed: Oct. 2, 1979

Related U.S. Application Data

[60] Division of Ser. No. 935,762, Aug. 22, 1976, Pat. No. 4,198,371, which is a continuation-in-part of Ser. No. 879,467, Feb. 21, 1978, abandoned, which is a division of Ser. No. 733,916, Oct. 19, 1976, Pat. No. 4,095,608.

[30] Foreign Application Priority Data

Oct. 22, 1975 [GB] United Kingdom ............... 43455/75
Oct. 12, 1976 [CA] Canada .................................. 263146
Jan. 26, 1977 [DE] Fed. Rep. of Germany ... 7702199[U]
Sep. 5, 1977 [NZ] New Zealand ......................... 185103

[51] Int. Cl.³ .............................................. B29F 1/14
[52] U.S. Cl. .................................................. 425/438
[58] Field of Search ................ 264/318; 425/438, 556, 425/DIG. 58

[56] References Cited

U.S. PATENT DOCUMENTS

| | | | |
|---|---|---|---|
| 1,887,993 | 11/1932 | Conner | 425/438 X |
| 3,325,576 | 6/1967 | Kessler | 264/318 |
| 3,987,144 | 10/1976 | Nickold | 425/DIG. 58 |

FOREIGN PATENT DOCUMENTS 834140  3/1952  Fed. Rep. of Germany ........... 264/318

Primary Examiner—Thomas P. Pavelko
Attorney, Agent, or Firm—Sim & McBurney

[57] ABSTRACT

A molding method and apparatus is described for the formation of plastic coin holders characterized by a generally C-shaped body in which portions of the male and female mold parts are moved relative to each other to permit the coin holder to be sprung off the male member.

6 Claims, 6 Drawing Figures

METHOD AND APPARATUS FOR MOLDING HOLDERS FOR DISC-LIKE OBJECTS

REFERENCE TO RELATED APPLICATION

This application is a division of application Ser. No. 935,762 filed Aug. 22, 1976 now U.S. Pat. No. 4,198,371 issued Apr. 15, 1980 which is a continuation-in-part of application Ser. No. 879,467 filed Feb. 21, 1978, now abandoned which in turn is a division of application Ser. No. 733,916 filed Oct. 19, 1976, (now U.S. Pat. No. 4,095,608).

FIELD OF INVENTION

The present invention relates to the molding of holders for disc-like objects.

BACKGROUND TO THE INVENTION

In my copending application Ser. No. 733,916, referred to above, (now U.S. Pat. No. 4,095,608), there is described an integrally-formed holder for disc-like objects constructed of flexible polymeric material. The holder comprises an elongate body having a generally C-shaped cross-section and a radius of curvature substantially equal to the radius of the disc-like objects and an end wall integral with the body at each end thereof, the end walls defining a generally C-shaped opening in the ends of the body of smaller radius of curvature than the radius of curvature of the body.

The holder is capable of limited flexure about its axis to allow for insertion and removal of the disc-like objects through the curvilinear extremities by expansion of the linear distance between the curvilinear extremities beyond the diameter of the disc-like objects.

SUMMARY OF INVENTION

The present invention is directed to method and apparatus for the molding of such holders. The invention involves the provision of a mold having an elongate, generally C-shaped mold cavity corresponding in shape to the shape of the holder and consisting of separable female mold parts having a part line which intersects the axis of the mold cavity and an inner mold core shaped to provide the curvilinear extremities of the holder on a straight line parallel to and spaced from the part line. Molten polymeric material is injected into the mold cavity and solidified therein. The mold is opened about the part line and the portion of the female mold part remaining adjacent the outer wall of the holder is removed therefrom. The holder then is flexed around the mold core to spring release the same from the mold.

DESCRIPTION OF PREFERRED EMBODIMENTS

Figure 1:
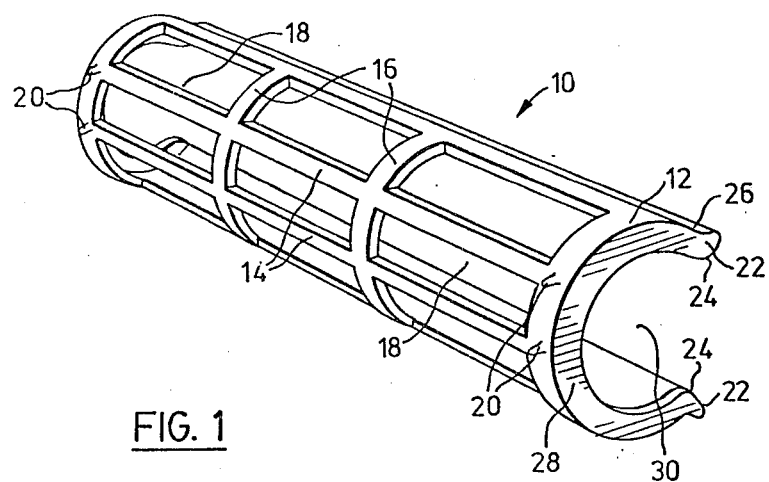
FIG. 1 is a perspective view of one embodiment of a coin holder produced by the method of the present invention.

Referring to FIG. 1 of the drawings, a coin holder 10 has an elongate body 12 which has a generally C-shaped cross-section. The body 12 is formed with a radius of curvature which is the radius of curvature of the coins to be packaged therein.

A plurality of longitudinal ribs 14 and a plurality of radial ribs 16 interconnect in the body to define the latticework and rectangular openings 18 in the body.

A pair of projections 20 is provided adjacent each end of the body 12 opposite the open side thereof to constitute feet for the holder to enable it to stand on a flat surface and prevent the holder from rolling, in contrast to the prior art paper wrapper coin rolls.

A pair of lips 22 is integrally formed with the body 12 and extends longitudinally thereof, one at each curvilinear extremity of the body 12. The lips 22 add considerable longitudinal strength to the holder 10 which assists in retaining coins within the holder 10. Each of the lips 22 has a triangular cross-section and includes a planar surface 24 which is integral with the inner surface of the body 12.

The planar surfaces 24 are divergent away from the curvilinear extremities of the body 12 and assist in the insertion of the coins into the holder 10 and removal of coins from the holder 10, as will become more apparent below.

One or both of the planar surfaces 24 may be provided with regularly spaced indicia, indicating fractions of the total numbers of coins intended to be packaged in the holder 10.

The lips 22 also have a second planar surface 26 which is integral with the outer surface of the body 12. The planar surfaces 26 are parallel to each other and each join with the respective first planar surface 24 at the apex of the triangular cross-section of the lips 22.

An end wall 28 integral with the body 12 is provided at each end of the body 12. Each end wall 28 defines a generally C-shaped opening 30 in the ends of the body 12 of smaller radius of curvature than the radius of curvature of the body 12.

Each of the end walls 28 is constructed so that the centres of curvature of the openings 30 lie on a straight line which is parallel to the axis of the body 12 but positioned closer to the lips 22 than the body axis, so that the lateral dimension of the end walls 28 decreases from a maximum adjacent the projections 20 to a minimum adjacent the lips 22.

The end walls 28 are required to prevent coins from exiting the body from the end thereof. However, end walls which totally close the end of the body 12 cannot be used since the holder 10 would be incapable of sufficient opening for insertion of the coins or for removal from a mold core during molding of the holder 10.

The end walls 28 provide a considerable spring grip strength to the holder 10 as compared to the body 12 alone, so that coins packaged in the holder 10 are not readily accidentally removed therefrom.

The crescent-shape contouring of the end walls 28 as described above assists in this result. Thus, the thinner portions of the end walls 28 adjacent the lips 22 allow the flexing required to allow coins to enter and leave the holder 10, while the thicker portions adjacent the projection 20 flex very little and exert the tension required to retain the coins within the holder 10. The holder may be handled roughly or dropped without any danger of loss of coins.

Since the end walls 28 assist in restoring the holder 10 to its original shape without fatigue upon insertion of coins into the holder or upon release of coins from the holder, the coin holder 10 is able to be reused many times.

The tapered nature of the end walls 28 also allows the programmed flexing open of the holder 10 as it is removed from an inner mold core during the opening of the mold, as described in more detail below, and spring restoration to the original shape immediately thereafter.

The holder 10 is constructed of suitable polymeric material, such as, polypropylene, to allow limited flexure of the holder 10 about its axis to allow for the insertion and removal of coins past the lips 22 by expansion of the linear distance between the curvilinear extremities beyond the diameter of the coins. The end walls 28 then spring back the holder 10 to the rest position.

Coins are packaged in the holder 10 by positioning a coin or a number of coins up to the total number intended to be packaged in the holder against the surfaces 24 and exerting pressure on the coin or coins thereby forcing the lips 22 apart to allow the coin or coins to enter the body 12, the body springing back to its rest position once the coin is in the body 12 to grip the coin or coins and entrap it in the structure. The coins may be loaded into the holder 10 manually or by machine.

When the holder 10 is empty or only a few coins are present in the holder, individual coins may be positioned in the holder 10 by inserting the coin side on through the opening and then twisting the coin into position.

Turning now to consideration of FIGS. 2 to 5 wherein there is illustrated a molding machine and molding procedure in accordance with one embodiment of the invention, the molding machine illustrated in these Figures employs two mold cavities and is capable of producing two coin holders 10 simultaneously. Such a number has been chosen for the purposes of illustration but the invention is applicable to any desired number of mold cavities within the molding machine, such as, eight or sixteen cavities. For faster production rates of the coin holders 10, higher numbers of mold cavities are used.

The structure and operation of the molding machine 100 illustrated in FIGS. 2 to 5 is described with reference to one mold cavity only, although it will be understood that such structure and operation is repeated for each mold cavity.

Figure 3:
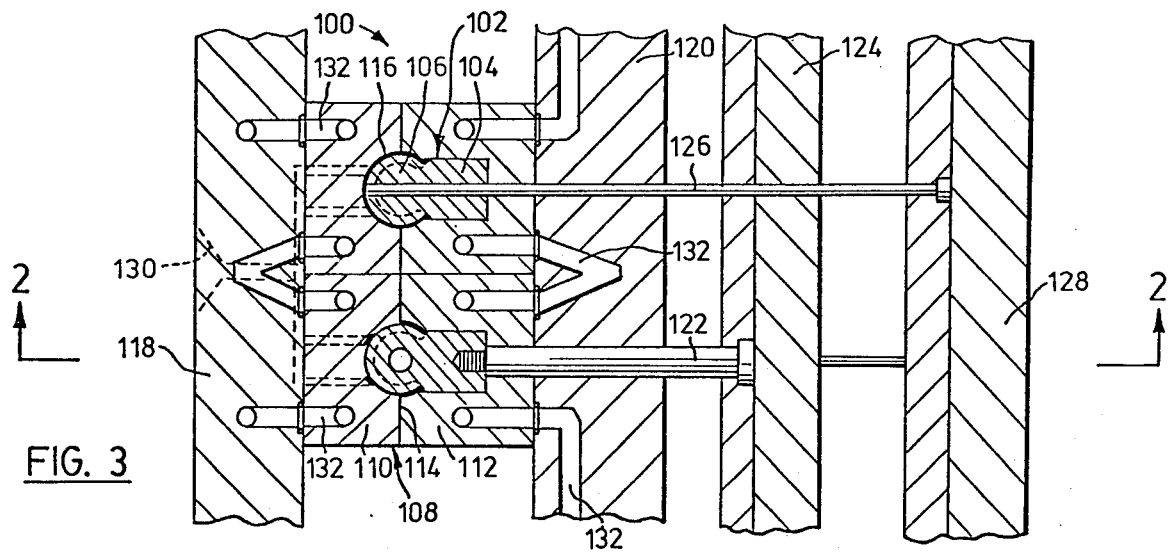
FIGS. 3 to 5 are side elevational views of the mold of FIG. 2 in a 2-cavity mold format and illustrating the sequence of the molding operation, the sectional views in the two molds being taken at different locations along their length.
Figure 4:
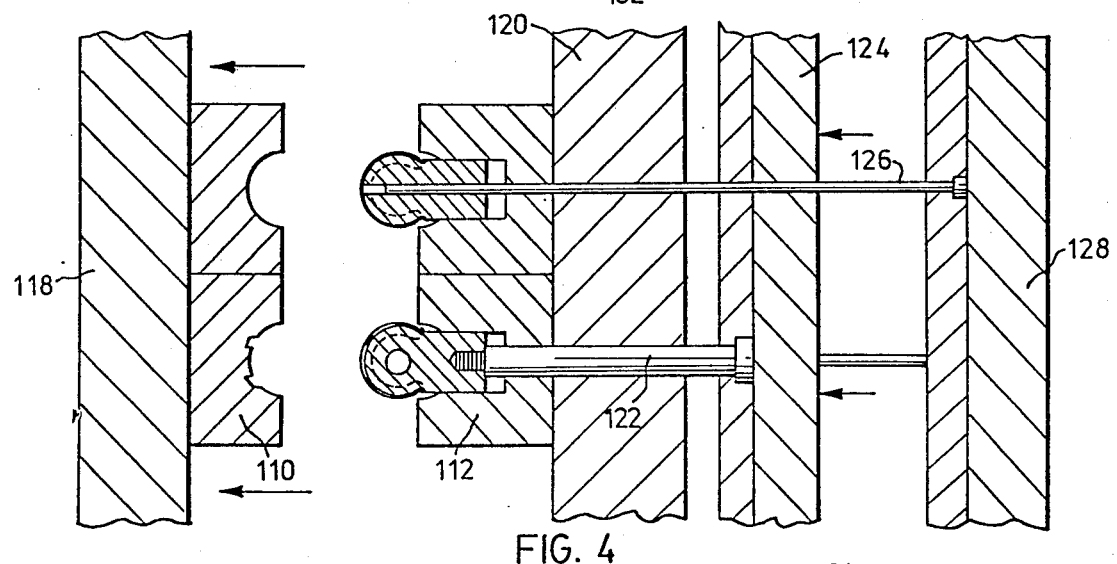
Figure 5:
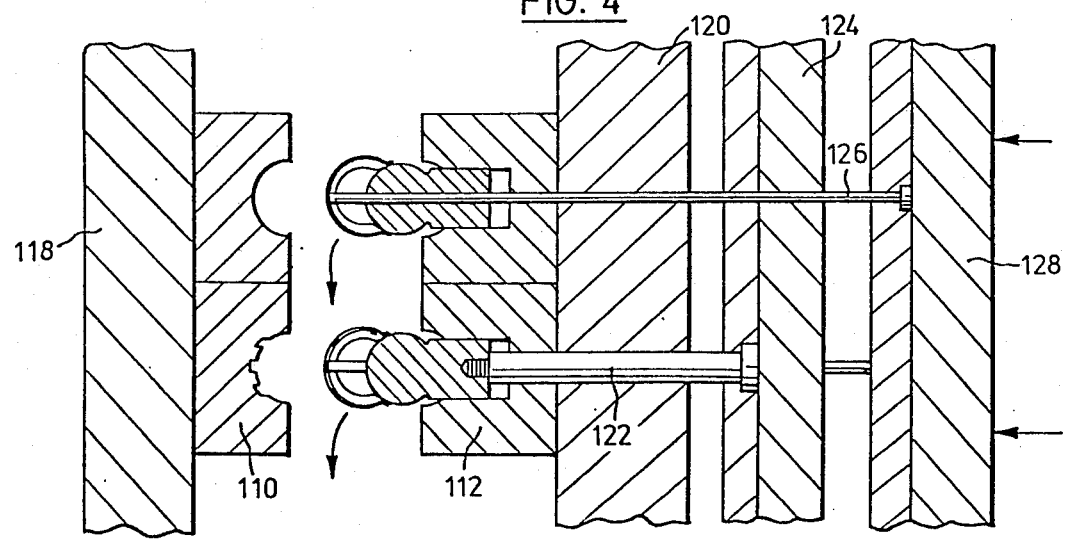

As indicated above, the sectional views in FIGS. 3 to 5 of the two separate molds are taken at different longitudinal positions in the molds, the upper mold section being taken close to one end and the lower mold section being taken at an intermediate location between the ends.

A single mold 102 includes an inner mold member 104 having an elongate part cylindrical head or core 106 shaped to conform to the shape of the interior of the holder 10 and a two-part female or outer mold member 108 having first and second parts 110 and 112 which are separable one from another along a part line 114 which passes through the axis of the mold cavity in which the coin holder 10 is to be formed. The inner mold head or core 106 and the outer mold members 108 cooperate to define a mold cavity 116 within the mold 102 shaped to conform to the structure of the coin holder 10.

The mold cavity 116 is symmetrical so that the straight line joining the curvilinear extremities of the holder 10 lies parallel to the part line 114. This symmetrical arrangement assists in the removal of the coin holder 10 from the mold 102, as will become apparent below.

The first outer mold part 110 is mounted on a molding machine frame element 118 for horizontal movement into and out of engagement with the second outer mold part 112. The second outer mold part 112 is mounted on a stationary molding machine frame element 120.

The inner mold member 104 is mounted at one end of a pair of horizontally-directed parallel shafts 122 passing through the stationary mold frame element 120 and mounted to a second movable mold frame element 124. A pair of parallel push rods 126 are mounted at one end to a third movable mold frame member 128 and pass through the mold frame members 120,124 and the inner mold member 104 to the mold cavity 116, one adjacent each end of the inner mold member 104.

Figure 2:
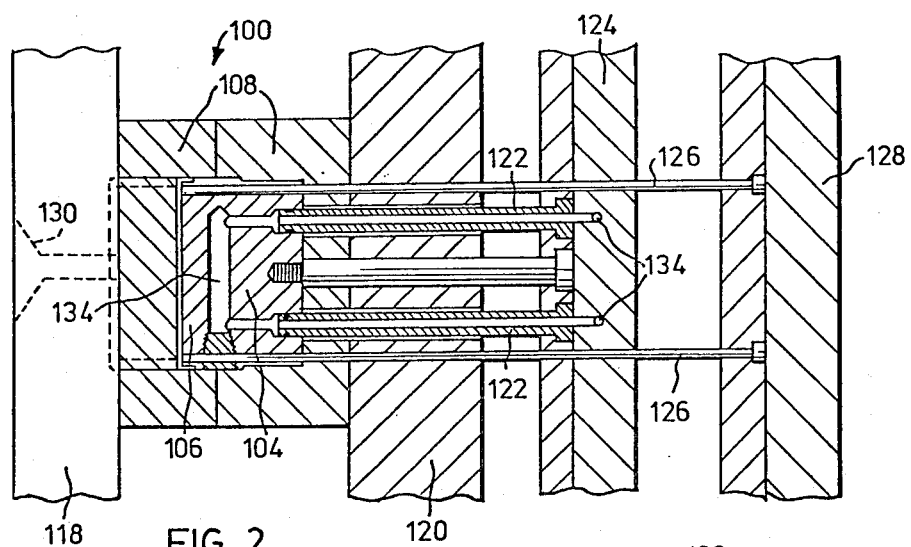
FIG. 2 is a plan sectional view of a mold provided in accordance with one embodiment of the invention for effecting the method of the invention and taken along line 2—2 of FIG. 3.

The closed stationary position of the various elements of the molding machine 100 is shown in FIGS. 2 and 3. A molten polymeric material inlet 130 is provided in fluid flow communication with the mold cavity 116 for feeding the polymeric material from which the coin holder is formed, such as, polypropylene, in a molten state into the cavity 116.

Channels 132 are provided in the female mold parts 110, 112 for the passage of cooling or heating fluid therethrough. Similar channels 134 are provided in the inner mold member 104 to convey cooling or heating fluid therethrough. The passage of, generally, cooling fluid through the channels 132 and 134 rapidly cools the molten polymeric material injected into the mold cavity 116 and speeds up the cycle time of the molding operation.

OPERATION

In the operation of the molding machine 100, molten polymeric material is fed into the mold cavity 116 and allowed to solidify at least to the extent of providing structural integrity to the coin holder in the mold cavity, preferably under the influence of mold part cooling fluid passing through passages 132 and 134.

The first outer mold part 110 then is withdrawn from the engagement with the second outer mold part 112, so that the mold is opened along the part line 114 and the outer surface of the lower portion of the coin holder 10 is exposed. Under the influence of movement of the movable frame member 124 the inner mold member 104 is moved forward towards the space vacated by the first outer mold part 110, so that the exterior surfaces of the upper portion of the coin holder 10 are freed from engagement with the second outer mold part 112. This sequence of actions is illustrated in FIG. 4.

Next, the push rods or knock-out pins 126 move forward and push the coin holder 10 off the mold core 106 so that the coin holder 10 is free to fall to a collection area (not shown). As the coin holder 10 is pushed off the mold core 106 by the knock-out pins 126, the coin holder 10 resiliently flexes open evenly on each side of its jaws so that the distance between the curvilinear extremities of the coin holder 10 is gradually expanded to a linear distance equal to the diameter of the head 106, and then resiliently snaps back to the "rest" position shown in FIG. 1, as the coin holder 10 springs off the head 106.

Since the jaws of the coin holder 10 are flexed open evenly, a minimum of distortion is introduced to the product and a high production speed is attained.

It is clear from this description of the molding operation that it is necessary for the head 106 of the inner molding member 104 to move forward a distance at least sufficient for the curvilinear extremities of the holder 10 and all portions of the coin holder 10 which formerly engaged the second outer mold part 112 to clear possible engagement with the second outer mold part 112 during the flexure of the coin holder 10 off the head 106.

DESCRIPTION OF ALTERNATIVE EMBODIMENTS

Figure 6:
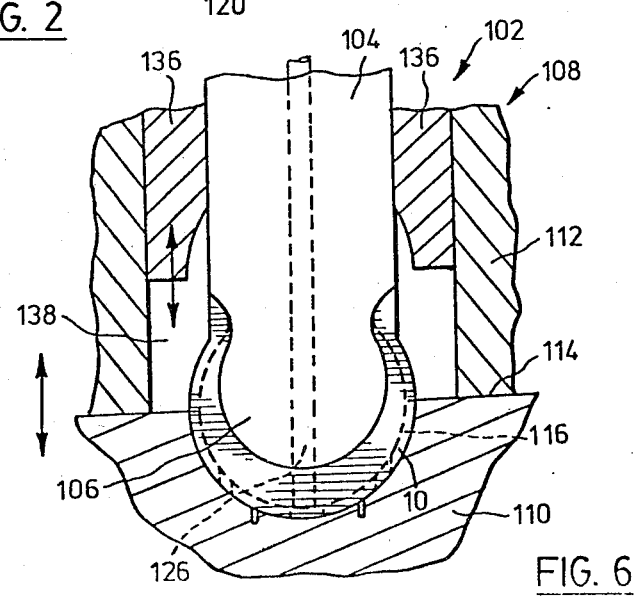
FIG. 6 is a sectional view of an alternative mold structure.

While the molding machine 100 and the molding method effected thereon represent the preferred embodiment of the invention and the best mode currently known to the applicant, alternative embodiments of the invention exist and reference now will be had to FIG. 6 of the accompanying drawings.

In the embodiment of FIG. 6, the mold 102 is oriented differently from that in FIGS. 2 to 5, so that the mold part line 114 is horizontal instead of vertical and the inner mold part 104 is vertically oriented with the axis of the head 106 extending horizontally. The orientation of the mold 102 in FIGS. 2 to 5 may be oriented in a similar way, if desired, and similarly, the embodiment of FIG. 6 may be oriented horizontally, if desired.

In the embodiment of FIG. 6, the inner mold member 104 is mounted in a fixed position and does not have the same reciprocal motion as in the embodiment of FIGS. 2 to 5. The second outer mold part 112 is provided with slidable portions 136 which in their lower position form part of the mold cavity 116 and engage the upper and outer portions of the coin holder 10 when such is formed in the cavity and which in their upper position leave gaps 138 between the coin holder 10 and the remainder of the second outer mold part 112.

When the mold 102 in FIG. 6 is opened along the part line 114, the coin holder 10 is removed in the same way as described with reference to FIGS. 2 to 5, i.e., under the influence of knock-out pins 126, except that, in this case, the movable mold portions 136 are retracted to allow space for the upper portion of the holder 10 to clear the second outer mold part 112 upon flexing under the influence of the knock-out pins 126, rather than the male mold member 104 being moved forward, as is the case in the embodiment of FIGS. 2 to 5.

SUMMARY

The present invention, therefore, provides a molding procedure and molding machine for effecting such procedure, for the manufacture of integrally-formed plastic coin holders. Modifications are possible within the scope of the invention.

What I claim is:

1. A mold for molding an elongate resiliently flexible article having a generally C-shaped cross-section and an end wall integral with the body at each end thereof, the ends walls defining a generally C-shaped opening in the ends of the body of smaller radius of curvature than the radius of curvature of the body, said mold comprising:
    a mold cavity corresponding in shape to the shape of said elongate article,
    molten polymeric material feed means communicating with said cavity for feed molten polymeric material thereto,
    an inner part cylindrical elongate mold core,
    an outer mold member cooperating with said inner mold core to define said cavity,
    said outer mold member consisting of two parts separable about a part line which intersects the axis of said core,
    said cavity being shaped to provide the curvilinear extremities of the article lying on a straight line parallel to said mold part line,
    a pair of movable push rods extending in parallel through said inner mold core perpendicular to the axis thereof, and
    means selectively establishing spacing between said core and the adjacent outer mold part when said mold is opened about said part line which is greater than the dimension of the mold cavity.

2. The mold of claim 1, wherein said latter means comprises means for moving said mold core away from said adjacent outer mold core part when said outer mold member is opened about said part line.

3. The mold of claim 1, wherein said latter means comprises portions of said adjacent mold part movable from a cavity-defining position to a spacing position.

4. The mold of claim 1, wherein said push rods are mounted on a movable frame member for simultaneous movement between a position communicating with said mold cavity and a coin holder-ejecting position.

5. The mold of claim 1, wherein said inner mold core and said outer mold member is provided with channels therein for conveying cooling or heating fluid therethrough.

6. A molding machine comprising a plurality of molds constructed as defined in claim 1, 2, 3, 4 or 5 and arranged to operate simultaneously.

* * * * *